Nov. 11, 1969        R. E. FENTON        3,478,351
TACTILE DISPLAY SYSTEM FOR AIDING AN OPERATOR
IN VEHICULAR CONTROL
Filed Jan. 13, 1967                        3 Sheets-Sheet 1

INVENTOR.
ROBERT E. FENTON
BY
MAHONEY, MILLER & RAMBO
BY W. H. Rambo
ATTORNEYS

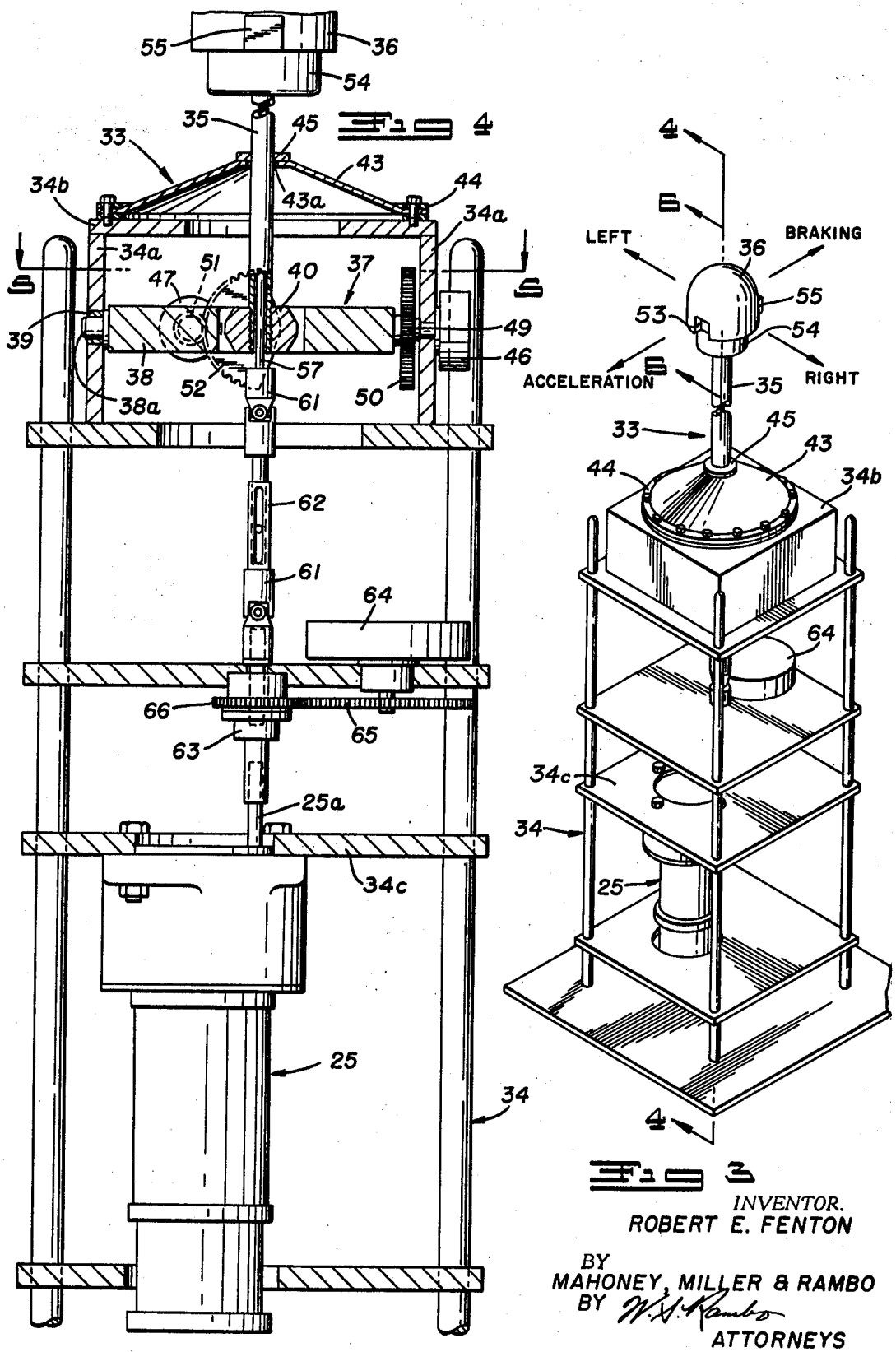

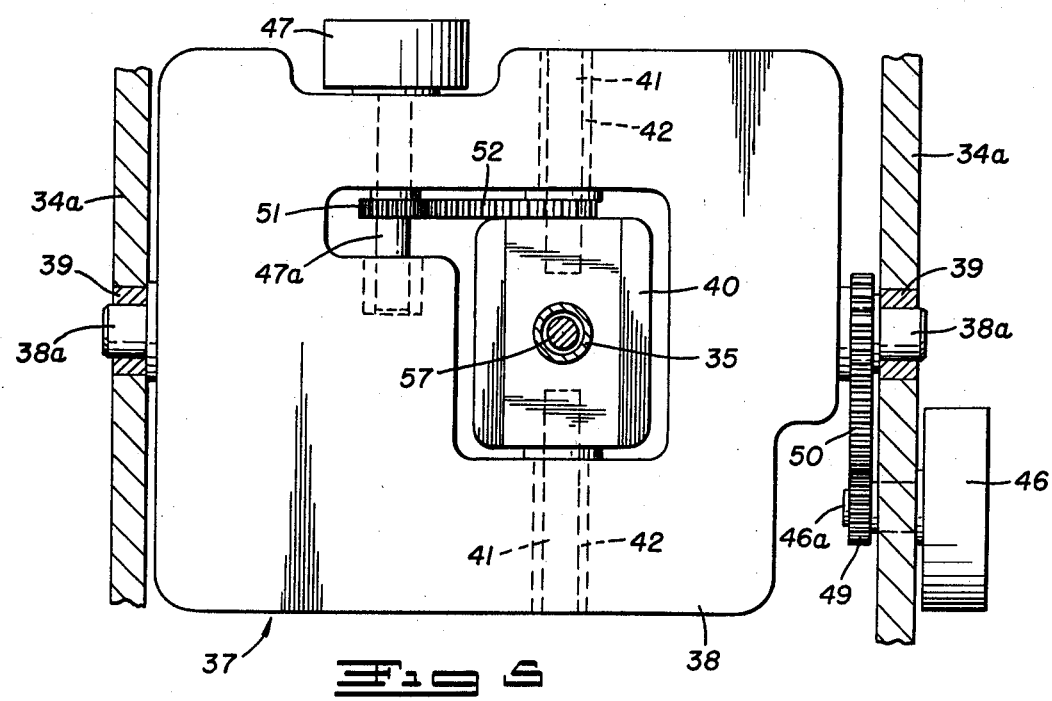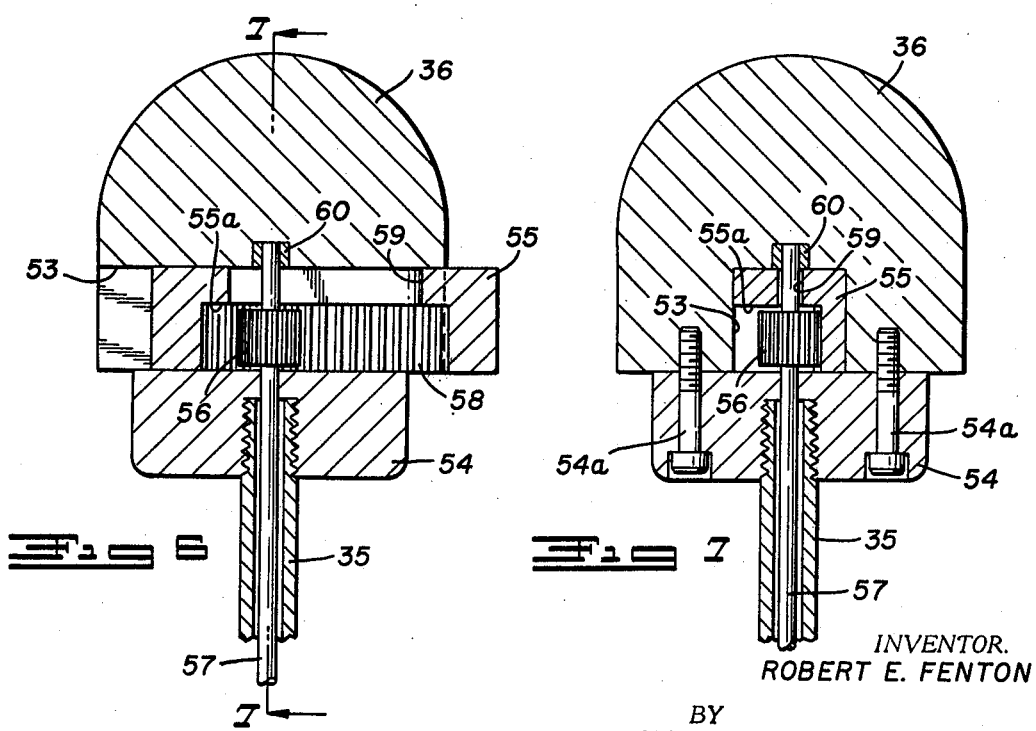

United States Patent Office 3,478,351
Patented Nov. 11, 1969

3,478,351
TACTILE DISPLAY SYSTEM FOR AIDING AN OPERATOR IN VEHICULAR CONTROL
Robert E. Fenton, Columbus, Ohio, assignor to The Ohio State University, Columbus, Ohio, an institution of higher learning of Ohio
Filed Jan. 13, 1967, Ser. No. 609,098
Int. Cl. G08b
U.S. Cl. 340—407          4 Claims

ABSTRACT OF THE DISCLOSURE

Information related to vehicular operation is presented to the operator by a kinesthetic-tactile display device incorporated in actuating means for the vehicle's control mechanism with the information thus presented utilized by the operator in determining subsequent operation of the actuating means to effect control over the vehicle. An electromechanical system controls the tactile display device in accordance with the system's determination of a parameter or parameters related to the vehicle's operation.

---

An operator's control of a vehicle relative to other vehicles or objects is dependent on determination of vehicle related parameters, such as relative spatial or motional relationship, and subsequent response to such parameters by the operator to effect control of the vehicle. In the case of automotive vehicles, two pertinent control parameters are relative spacing or distance to another vehicle or an object and relative motion as to another vehicle or an object with these parameters being particularly important in high density traffic situations. Although intervehicle spacing is also important to an operator of an aeronautical vehicle, the relative position of the vehicle to a predetermined flight path is often of greater importance and may form the control parameter. These parameters are presented as examples for purposes of illustration as are the types of vehicles and are not intended to limit the scope of application of this invention. Irrespective of the vehicle type or control parameters, human sensory or perceptive capabilities as to these control parameters are frequently the limiting factors in vehicular operation, and accordingly, it is necessary to aid or supplement existing capabilities in order that vehicle operations may be extended or enhanced. Aiding or supplementing of the human capabilities is achieved through the provision of apparatus comprising parameter sensing means and display means which imparts to the vehicle operator, information as to the vehicle related parameters as determined by the sensing means.

Displays for imparting additional information as to various parameters to vehicle operators have generally been of the visual type in the form of an indicating instrument. Operators of the present day vehicles, automotive, aeronautical or other type, are already confronted with numerous instruments or indicating devices requiring continuing visual interpretation as well as having the responsibility of maintaining a visual outlook from the vehicle and the addition of other visual displays further increases the operating complexity. Consequently, merely providing additional visual displays to impart further information in aiding and supplementing the operator's capabilities has not been found to be as effective as anticipated. Experimental observations have shown that in automotive vehicle tests involving high density traffic situations, vehicle operators will ignore visual displays imparting information as to intervehicle spacing and rely on direct visual determination of vehicle spacing, particularly as intervehicular spacing decreases.

The display system of this invention imparts information as to vehicle related parameters by a kinesthetic-tactile display device and thus obviates the disadvantages of an additional visual display as previously discussed. The display device is carried by actuating means of the vehicle's control mechanism which actuating means is adapted to be grasped by the operator's hand and manipulated to effect control over the vehicle. Utilizing a tactile display to impart information by inducing muscular movement in the operator's hand which can be readily perceived, permits transmission of information to the operator via a channel other than visual which is already being utilized at a maximum. The display system includes an electromechanical system which controls the tactile display device and incorporates parameter sensing or detecting means and relieves the vehicle operator of the detecting function. Also, the display system is preferably constructed to indicate the corrective action required of the operator in controlling the vehicle and thereby relieve the operator of a further function.

These and other objects and advantages of this invention will be readily apparent from the following detailed description of an embodiment thereof and the accompanying drawings.

In the drawings:

FIGURE 3 is a perspective view of a vehicular control mechanism provided with a tactile display device.

FIGURE 4 is a vertical sectional view of the control mechanism taken along line 4—4 of FIGURE 3.

FIGURE 5 is a horizontal sectional view taken along line 5—5 of FIGURE 4.

FIGURE 6 is a vertical sectional view taken along line 6—6 of FIGURE 3.

FIGURE 7 is a vertical sectional view taken along line 7—7 of FIGURE 6.

Figure 1:
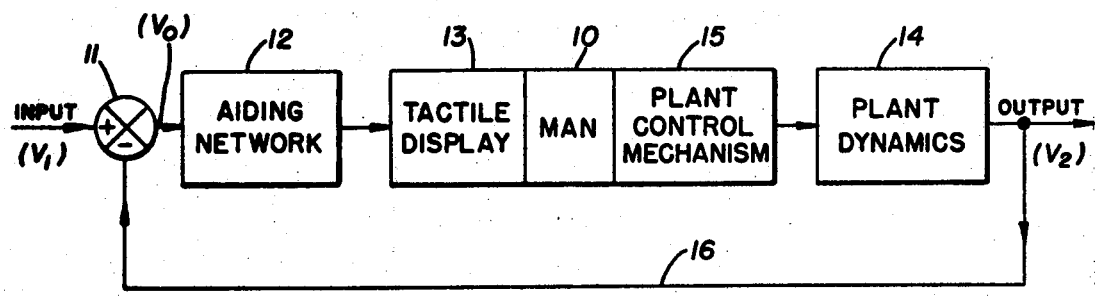
FIGURE 1 is a block diagram of a vehicular control system embodying the tactile display system of this invention.

The kinesthetic-tactile display system of this invention is described and illustrated as applied to an automotive vehicle with portions of the apparatus being designed for specific installation or incorporation in an automotive vehicle control mechanism. It is to be understood that this specific application is illustrative only and it will be readily apparent that the tactile display system may be readily incorporated in other types of vehicles. A typical vehicular control system for a manually controlled vehicle utilizes a vehicle operator or man as the interconnecting link between the display system presenting the input parameter signal and the control mechanism of the vehicle which effects control over the plant dynamics, as is shown in FIGURE 1. In the illustrative example of an automotive vehicle, the plant dynamics represents the propulsion system of the vehicle which is capable of acceleration and deceleration and the directional control mechanisms of the automotive vehicle. In FIGURE 1, the function of the vehicle operator in forming an interconnecting link between the parameter display system and the portions of the plant dynamics is indicated by the block labeled "Man" and further identified by the numeral 10. The tactile display system of this invention includes the elements appearing to the left of the "Man" element and starts at the line labeled "Input" which is connected to a summing network 11. The output of the summing network 11 is fed to an aiding network 12 and designated by the numeral 13. Information pertaining to one or more vehicle related parameters is collected at the input of the summing network 11 and the resultant signal, through the operation of the aiding network 12, is effective in controlling the tactile display 13 to impart the information embodied in the signal to the vehicle operator 10 by inducing muscular movement, or by application or removal of body pressure.

The vehicle operator 10, in response to the kinesthetic-tactile display, may then effect control over the vehicle, as represented by the block labeled "Plant Dynamics" and further identified by the numeral 14, through his immediate actuation of the plant control mechanism 15. The effect of actuation of the plant control mechanism 15 may be transmitted, either mechanically or electrically, to the plant dynamics 14 and thereby effect a change or correction in the output of the plant dynamics or the vehicle. The vehicle control system illustrated in FIGURE 1 may also be provided with a feedback circuit, indicated at 16, which returns an output related signal to the summing network 11 to thereby modify the parameter input signal to the aiding network 12 as is usually done in the case of fully automated, closed loop systems. Utilization of a feedback circuit 16 in the vehicle control system enhances the operation in that the control becomes more smooth since large errors are gradually compensated for in the parameter input signal.

The functioning of the vehicle control system may be more clearly illustrated by a specific example, such as where a vehicle provided with the illustrated system is driven behind another vehicle and it is desired to maintain the same relative velocity of the following vehicle and to maintain a relatively constant spacing between the vehicles. In this example, the speed of the leading car is represented by the symbol $V_1$ and appears as the input parameter signal to the summing network 11. The speed of the following vehicle or the vehicle illustrated in FIGURE 1 is represented by the symbol $V_2$ and this signal also appears at the summing network 11. By operation of the summing network 11, the difference of the speeds $V_1$ and $V_2$ provide a relative velocity signal which is indicated by the signal $V_0$ at the output of the summing network 11. Assuming that the relative velocity signal $V_0$ is of an electrical nature, the aiding network 12 will be designed to receive the signal $V_0$ and transform the signal to a mechanical movement, which is utilized in controlling the kinesthetic-tactile display 13. The vehicle operator 10 will respond to the display by appropriately manipulating the plant control mechanism 15 to effect a desired change in the plant dynamics 14 and result in a change of the output of the vehicle or, in this instance, a change in the speed $V_2$. As long as there is a relative velocity between the two vehicles, there will be a tactile display requiring response by the vehicle operator 10 to effect the necessary correction with the complete absence of a signal indicating a zero relative velocity.

Figure 2:
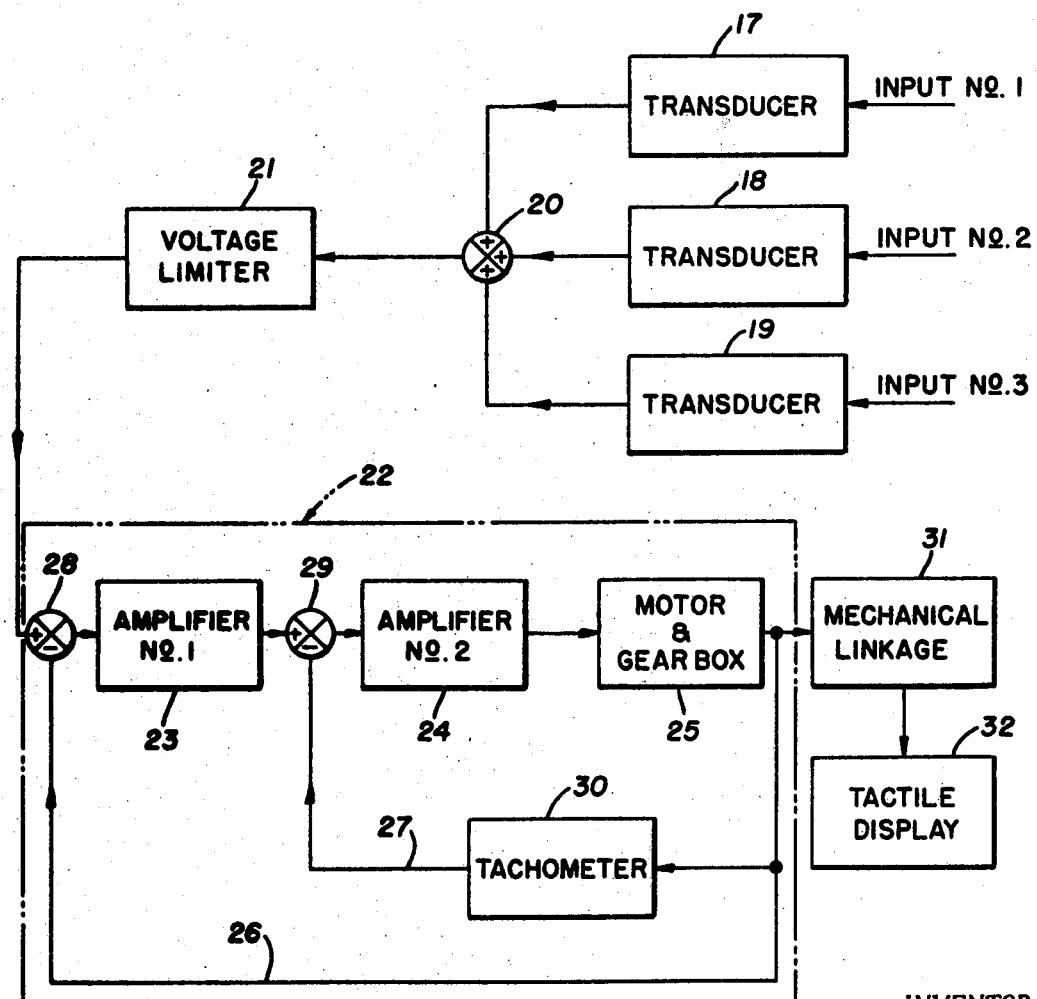
FIGURE 2 is a block diagram of an embodiment of the tactile display system of this invention.

This invention is immediately concerned with that porton of the vehicle control system appearing at the left side of the diagram of FIGURE 1 and which results in forming the kinesthetic-tactile display to which the vehicle operator responds. This portion of the vehicle control system is further amplified in the block diagram of FIGURE 2. The apparatus shown in FIGURE 2 only differs from the correspondingly related elements or components shown in FIGURE 1 in that there are now a multiplicity of inputs which are designated as Nos. 1, 2 and 3 whereas the apparatus of FIGURE 1 is shown and described as having only one input. The number of inputs is merely illustrative and may be increased or decreased as desired for a specific application.

Each of the input signals, which is responsive to a specific vehicle related parameter, operates on a respective one of three transducers 17, 18 and 19, which are designed to provide a related electrical input signal for the control system. The input signals to the respective transducers may be of either a continuous form or a discrete bit-type as may be determined most appropriate for a specific application with respect to the vehicle parameters being utilized for control. Irrespective of whether the input is of continuous or discrete-bit form, the output signal from each respective transducer will be an appropriate electrical input signal to the control system. The several output signals are first fed to a summing network 20 with the resultant signal being first fed to a voltage limiter circuit 21. It is the function of the voltage limiter circuit 21 to assure that the output signal from the circuit will not overload the remaining portions of the control system.

From the voltage limiter circuit 21, the resultant signal is fed to a closed loop control system, indicated generally at 22. In the closed loop control ssytem 22, which is of a conventional type, the electrical input signal is converted to a mechanical output or displacement. Included in the illustrated control system 22 and performing the electromechanical transforming function are two serially connected, electronic amplifiers 23 and 24 which control the operation of an electrical motor 25. The motor 25 is indicated as being drivingly connected to a mechanical output through an integral gear box having a selected design to provide a mechanical output which is proportionally related to the electrical input signal to the closed loop control system 22. Also included in the closed loop control system 22 are two feedback circuits 26 and 27 which are adapted to derive an electrical input signal from the mechanical output of the motor and gear box 25 and are respectively connected to summing networks 28 and 29 which are connected in circuit with and immediately preceding the respective first and second amplifiers 23 and 24. Both of the feedback circuits 26 and 27 are responsive to the mechanical output of the motor and gear box 25 with the circuit 26 being directly responsive to the rotational displacement whereas the circuit 27 is responsive to the rate of change of the rotational displacement as determined by a tachometer 30 which is drivingly connected to the output of the motor. The mechanical output of the closed loop control system 22 is transmitted through the mechanical linkage 31 to the kinesthetic-tactile display 32.

To further illustrate the application of the tactile display system of this invention, a typical actuating mechanism for a vehicle control mechanism is shown in the remaining figures of the drawings. This actuating mechanism is provided with a kinesthetic-tactile display device which may be the element indicated at 13 in FIGURE 1 or the element 32 in FIGURE 2. The illustrated actuating mechanism is specifically designed for installation in automotive vehicles and is operative to effect the functions of steering either to the right or the left and acceleration or deceleration. These control functions are effected by electrical interconnecting systems which are responsive to manipulation of the actuating mechanism and are coupled with the control mechanism of the vehicle to control respective elements of the plant dynamics 14, indicated in FIGURE 1. The particular electrical systems and interconnection with the plant dynamics are not pertinent to this invention and, therefore, are omitted from the description and drawings with the exception of illustrating the point of providing an appropriate input signal.

Having reference specifically to FIGURE 3, the actuating mechanism is seen to comprise a supporting framework 34 on which is mounted an actuating lever 35. This actuating lever 35 is disposed in a generally vertically oriented position and is provided with a control head 36 at its uppermost end. The mounting of the actuating lever 35 is most clearly illustrated in FIGURES 4 and 5 where it can be seen that the lower end of the actuating lever 35, which is formed from an elongated tubular shaft, is attached to a gimbal mechanism 37 which is designed to permit angular displacement of the actuating lever 35 in either direction in two planes which are orthogonally disposed to each other. This gimbal mechanism 37 includes an outer gimbal frame 38 which is journaled on diametrically opposed shafts 38a in a suitable bearing structure 39 carried by upstanding brackets 34a of the supporting framework 34 of the actuating mechanism 33 and permits swinging movement of the gimbal frame about a horizontal axis. Positioned within the outer gimbal frame 38 is an inner gimbal frame 40 which is constructed as a mounting plate to which the actuating lever 35 may be secured. A pair of support shafts 41 extending from diametrically disposed sides of the frame 40 project into the outer gimbal frame 38 and are journaled in suitable bearing structures 42 carried by the outer gimbal frame. The shafts 41 and bearing structures 42 are positioned to permit rotation of the inner gimbal frame 40 about a horizontal axis which is orthogonally disposed relative to the axis of rotation of the outer gimbal frame 38. Attachment of the actuating lever 35 to the inner gimbal frame 40 may be effected by threading the lower end portion of the lever into a mating threaded aperture formed in the inner gimbal frame.

The actuating lever 35 is normally maintained in a vertically oriented position and displacement from this vertical position will result in forming a suitable input signal to the plant dynamics for controlling the vehicle as determined by the operator. Maintenance of the actuating lever 35 in this normally vertical position is effected by a resilient diaphragm 43 which is secured to a mounting plate 34b carried at the upper end of the supporting framework 34. As can be best seen in FIGURE 3, this diaphragm 43 is of a circular configuration having the outer periphery secured to the mounting plate by a clamping structure 44 with the actuating lever 35 extending through the center. A retainer clamp 45 secured to the marginal edge portions of the diaphragm at a central opening 43a is also rigidly attached to the actuating lever 35.

In the installation of the actuating mechanism 33 is an automotive vehicle, the apparatus would be oriented with the axis of rotation of the outer gimbal frame 38 perpendicular to the normal axis of movement of the vehicle. Thus, the axis of rotation of the inner gimbal frame 40 would be parallel and aligned with the normal direction of movement of the vehicle. With this orientation, the actuating mechanism is constructed to provide control signals to the plant dynamics as is diagrammatically indicated in FIGURE 3. Pushing the control head 36 forward in the direction of forward movement of the vehicle will thus effect deceleration of the vehicle whereas movement of the control head in a reverse direction will effect acceleration of the vehicle. Displacement of the control head in a plane which is perpendicular to the direction of movement of the vehicle will effect a change in the direction of travel such as causing the vehicle to turn to the right or the left as determined by the direction of movement of the control head.

Physical displacement of the control head 36 resulting in actuation or rotational movement of the actuating lever 35 will be translated to an appropriate electrical signal by the respective potentiometers 46 and 47. The potentiometer 46 is mechanically coupled to the outer gimbal frame 38 by a pinion gear 49 which is meshed with a sector-form gear segment 50 carried by the outer gimbal frame with the potentiometer being mounted on the supporting framework 34. Rotational movement of the outer gimbal frame 38 will thus result in rotation of the input drive shaft 46a of the potentiometer and result in a change in electrical output signal. Similarly, the rotational movement of the inner gimbal frame 40 is transmitted to the potentiometer 47 through a pinion gear 51 carried by the input drive shaft 47a of the potentiometer and meshed with a sector-form gear segment 52 attached to the inner gimbal frame. The electrical output connections of the respective potentiometers 46 and 47 are not further illustrated as they do not form a part of this invention and their interconnection with the control mechanism of the vehicle is understood by those skilled in this art.

Providing the kinesthetic-tactile display of this invention is an elongated bar 55 or finger which is mounted in the control head 36 for reciprocating movement in alignment with the axis of the normal vehicle movement, as can be best seen in FIGURES 4, 6 and 7. The finger 55 comprises an elongated bar of rectangular cross section which is disposed in an open-ended channel 53 formed in the base of the control head 36. The control head 36 is provided with a base plate 54 which closes the open bottom of the channel 53 and is secured to the control head by suitable means, such as bolts 54a. The actuating lever 35 is secured to the base plate 54 by threading the end portion into a socket formed in the base plate. Longitudinal displacement of the finger 55 is effected by a pinion and rack gear mechanism which is controlled by the motor 25 shown in FIGURE 2. A small pinion gear 56 mounted on an elongated shaft 57, which extends through the hollow-shaft actuating lever 35, may be selectively rotated in either direction to effect displacement of the finger 55 through intermeshing engagement with a rack gear 58 formed on a vertical wall of a longitudinal recess 55a cut in the lower side of the finger. An elongated slot 59, which is of a shorter length than the rack gear 58, is cut in the upper wall of the finger 55 in alignment with the longitudinal axis of movement and opens to the recess 55a, and the end of the shaft 57 projects through this slot and is journaled in a bearing 60 secured to the control head 36.

The opposite end of the shaft 57 is drivingly connected to the output shaft 25a of the motor and gear box 25 by mechanical linkage which includes a pair of universal joints 61, a telescoping shaft assembly 62 interconnecting the two universal joints, and a slip clutch 63. This mechanical linkage accommodates the movement of the gimbal frames during the movement of the actuating lever 35 through operation of the control head 36 by the vehicle operator. The motor and gear box 25 is mounted on the supporting framework 34 by a bracket 34c. Movement of the finger 55 is limited by the ends of the slot 59 engaging the end portion of the shaft 57 and thus prevents further rotation of the shaft 57. The provision of the slip clutch 63 will permit continued operation of the motor and gear box 25 in response to an input signal without damage to the display device. Included in the feedback circuit 26 is a potentiometer 64 which is drivingly connected to the mechanical linkage through connection to the shaft 57 by a pair of intermeshed gears 65 and 66. This potentiometer thus will provide a signal related to the rotational displacement of the shaft 57 and the longitudinal displacement of the finger 55.

The control head 36 has a designed configuration which is readily gripped by the hand of the vehicle operator with the spherical portion disposed in the palm of the hand. As a consequence of the relative orientation of the actuating means, the operator's fingers will extend downwardly over the forward facing open end of the slot 53. With the fingers 55 relatively positioned in the control head 36 with the end surface flush with the exterior surface of the control head, the operator will not sense any muscular movement and this will be the neutral or zero position of the tactile display. A signal from one or more of the inputs or parameter sensing devices which is related to an error or deviation from a normal condition will result in relative longitudinal displacement of the finger 55 by operation of the apparatus of FIGURE 2. This displacement of the finger 55 may be in either direction and result in either a projection of the finger from the control head 36 at the forward side or a retraction with the forward surface of the finger retracted into the slot 53 and leaving a recess at the forward face of the control head. Irrespective of the direction of movement of the finger 55, the movement of the finger will produce muscular movement as to the operator's fingers and thus forms a kinesthetic-tactile display.

To further illustrate operation of the kinesthetic-tactile display system, it will be assumed that one vehicle related parameter is of interest and changes or deviations of this parameter will be considered as to their effect on the display. A parameter of particular interest as to automotive vehicles is intervehicular spacing and it will be assumed that a predetermined spacing is to be maintained relative to an immediately preceding vehicle. A suitable sensing device (not shown) provides an input signal and will be designed to be responsive to the distance and any deviations from a predetermined spacing will result in an input signal related to this deviation. In response to this input signal, the apparatus shown in FIGURE 2 will operate to effect longitudinal displacement of the finger 55 in the control head 36 and thereby tactually impart to the vehicle operator information as to this deviation. If the intervehicular spacing has decreased from the desired value, the input signal will result in forward displacement of the finger 55 with consequent projection from the body of the control head 36. Projection of the finger will be sensed by the vehicle operator and the operator will then respond to correct the intervehicular spacing by pushing the actuating lever 35 forwardly to effect braking of the vehicle. As the spacing deviation is reduced, the finger 55 will retract into the control head 36 and, when fully retracted, the operator will permit return of the actuating lever to the center or neutral position. Should the intervehicular spacing increase, the apparatus will function to displace the finger 55 in the opposite direction and form a recess in the body of the control head 36 which will be sensed by the vehicle operator who will react by pulling the actuating lever rearwardly and thereby cause the vehicle to accelerate. The actuating lever will be returned to the neutral position when the spacing again reaches the desired value.

A second input signal may be provided by a second sensing device to effect control over the tactile display concurrently with the first signal. Such a second signal may be deviations of the vehicle's speed from a predetermined value and would further assist the vehicle operator in taking corrective action.

It will be readily apparent from the foregoing description and illustration of an embodiment of this invention that a kinesthetic-tactile display system is provided which is capable of imparting to a vehicle operator, information relating to one or more vehicle related parameters. Utilizing a kinesthetic-tactile display permits imparting of information to the vehicle operator in addition to the usual visual means of communication and will thus enhance vehicle operation.

Having thus described this invention, what is claimed is:

1. A kinesthetic-tactile display system for an operator controlled vehicle which has a control mechanism with actuating means for effecting at least one operator control function comprising at least one parameter sensor responsive to a vehicle related parameter and providing an input signal for the system which signal is related to said vehicle related parameter, a control head mechanically coupled with said actuating means and including at least one kinesthetic-tactile display device operative to tactually provide the vehicle operator with information, said control head being of a configuration adapted to be gripped by the operator's hand and including opposed front and rear surface portions engageable by the operator's hand and including opposed front and rear surface portions engageable by the operator's fingers and palm, respectively, said display device including an elongated bar mounted in said control head for longitudinally reciprocal movement relative to said opposed front and rear surfaces to contactingly engage a finger of the operator's hand, said elongated bar having a first end surface displaceable a distance outwardly and inwardly relative to the front surface of said control head with said first end surface being of an area permitting following by a finger of the operator's hand in either direction relative to said control head front surface to produce muscular movement in the operator's hand, and a second end surface displaceable a distance outwardly relative to the rear surface of said control head into contacting engagement with the operator's palm, and means coupling said parameter sensor and said tactile display device for producing a relative displacement of said elongated bar.

2. A tactile display system according to claim 1 wherein said means coupling said sensor and said display device is operable to selectively displace said elongated bar and which includes a mechanical actuator coupled with said elongated bar.

3. A tactile display system according to claim 2 wherein said parameter sensor provides an electrical input signal and said mechanical actuator comprises a servomechanism responsive to said electrical signal.

4. A tactile display system according to claim 1 which includes at least one other parameter sensor responsive to a vehicle related parameter and which provides a related input signal for the system, said means coupling said other parameter sensor with said tactile display device for producing a tactile display cumulatively responsive to said input signals.

References Cited

UNITED STATES PATENTS

| | | | |
|---|---|---|---|
| 2,754,505 | 7/1956 | Kenyon | 340—407 |
| 3,157,853 | 11/1964 | Hirsch | 340—407 X |
| 3,263,824 | 8/1966 | Jones et al. | 340—407 X |

JOHN W. CALDWELL, Primary Examiner

M. R. SLOBASKY, Assistant Examiner

U.S. Cl. X.R.

244—83; 340—27